(12) United States Patent
Gaarder et al.

(10) Patent No.: US 9,056,734 B2
(45) Date of Patent: Jun. 16, 2015

(54) APPARATUS FOR LOWERING AND RAISING A PICK ARM

(75) Inventors: Glenn W Gaarder, Ramona, CA (US); Ryan M. Smith, San Diego, CA (US); Daniel Scott Weinstein, San Diego, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 350 days.

(21) Appl. No.: 13/586,130

(22) Filed: Aug. 15, 2012

(65) Prior Publication Data

US 2014/0047935 A1    Feb. 20, 2014

(51) Int. Cl.
*B65H 3/06* (2006.01)
*G03G 15/00* (2006.01)
*H04N 1/00* (2006.01)

(52) U.S. Cl.
CPC ......... *B65H 3/0669* (2013.01); *Y10T 74/18056* (2015.01); *Y10T 74/18296* (2015.01); *G03G 15/602* (2013.01); *G03G 15/6511* (2013.01); *H04N 1/0062* (2013.01); *H04N 2201/0081* (2013.01); *B65H 3/0684* (2013.01); *B65H 2403/421* (2013.01); *B65H 2403/513* (2013.01)

(58) Field of Classification Search
CPC .............. B65H 3/0669; B65H 3/0684; B65H 2403/40; B65H 2403/42; B65H 2403/422; B65H 2403/44; B65H 2403/51; B65H 2404/152; B65H 2404/1521
USPC .......................................... 271/109, 117, 118
See application file for complete search history.

(56) References Cited

U.S. PATENT DOCUMENTS

| | | | |
|---|---|---|---|
| 4,800,813 A | 1/1989 | Leyendecker et al. | |
| 5,213,426 A | 5/1993 | Ewing | |
| 5,769,410 A * | 6/1998 | Davidson et al. | 271/109 |
| 5,863,036 A | 1/1999 | Tanaka et al. | |
| 6,666,446 B2 | 12/2003 | Gaarder et al. | |
| 7,584,952 B2 | 9/2009 | Gladwin et al. | |
| 7,594,649 B2 | 9/2009 | Liu et al. | |
| 7,648,134 B2 * | 1/2010 | Lim | 271/118 |
| 7,731,176 B2 * | 6/2010 | Bato-on et al. | 271/117 |
| 7,963,519 B2 * | 6/2011 | Bokelman et al. | 271/117 |
| 8,162,312 B2 * | 4/2012 | Tu et al. | 271/121 |
| 2004/0012139 A1 * | 1/2004 | Asada et al. | 271/113 |
| 2010/0206686 A1 | 8/2010 | Johnson et al. | |

FOREIGN PATENT DOCUMENTS

| | | | | |
|---|---|---|---|---|
| KR | 20000051563 | | 8/2000 | |
| KR | 20000051563 A | * | 8/2000 | ............... B41J 11/00 |

* cited by examiner

*Primary Examiner* — Jeremy R Severson
(74) *Attorney, Agent, or Firm* — Hewlett-Packard Patent Department

(57) ABSTRACT

An apparatus for lowering and raising a pick arm is disclosed herein. An example of the apparatus includes a shuttle assembly having a first direction of movement and a second direction of movement, and a lift assembly rotatably coupled to the shuttle assembly. The apparatus additionally includes a cam coupled to the lift assembly to transform rotary motion of the lift assembly into substantially linear motion that allows the pick arm to lower as a result of movement of the shuttle assembly in the first direction and that raises the pick arm as a result of movement of the shuttle assembly in the second direction. Other components and attributes of the apparatus are also disclosed herein, as are additionally examples of the apparatus. A method of lowering and raising the pick arm is further disclosed herein.

14 Claims, 17 Drawing Sheets

APPARATUS FOR LOWERING AND RAISING A PICK ARM

BACKGROUND

End-users appreciate ease of use and automation in electronic devices. They also appreciate cost effectiveness and size reduction in such devices. Designers and manufacturers may, therefore, endeavor to create or build electronic devices directed toward one or more of these objectives.

BRIEF DESCRIPTION OF THE DRAWINGS

The following detailed description references the drawings, wherein.

DETAILED DESCRIPTION

Automatic document feeders (ADFs) may be utilized by electronic devices, such as scanners, multi-function printers, and fax machines, to automate loading, selection, and feeding of media. Such automatic document feeders may utilize a pick arm that rests against a media stack to perform such automation.

This pick arm is lowered onto the media stack prior to operation. The pick arm is subsequently raised after its work on the media stack so that a new media stack may be loaded onto or in the automatic document feeder for processing.

Figure 1:
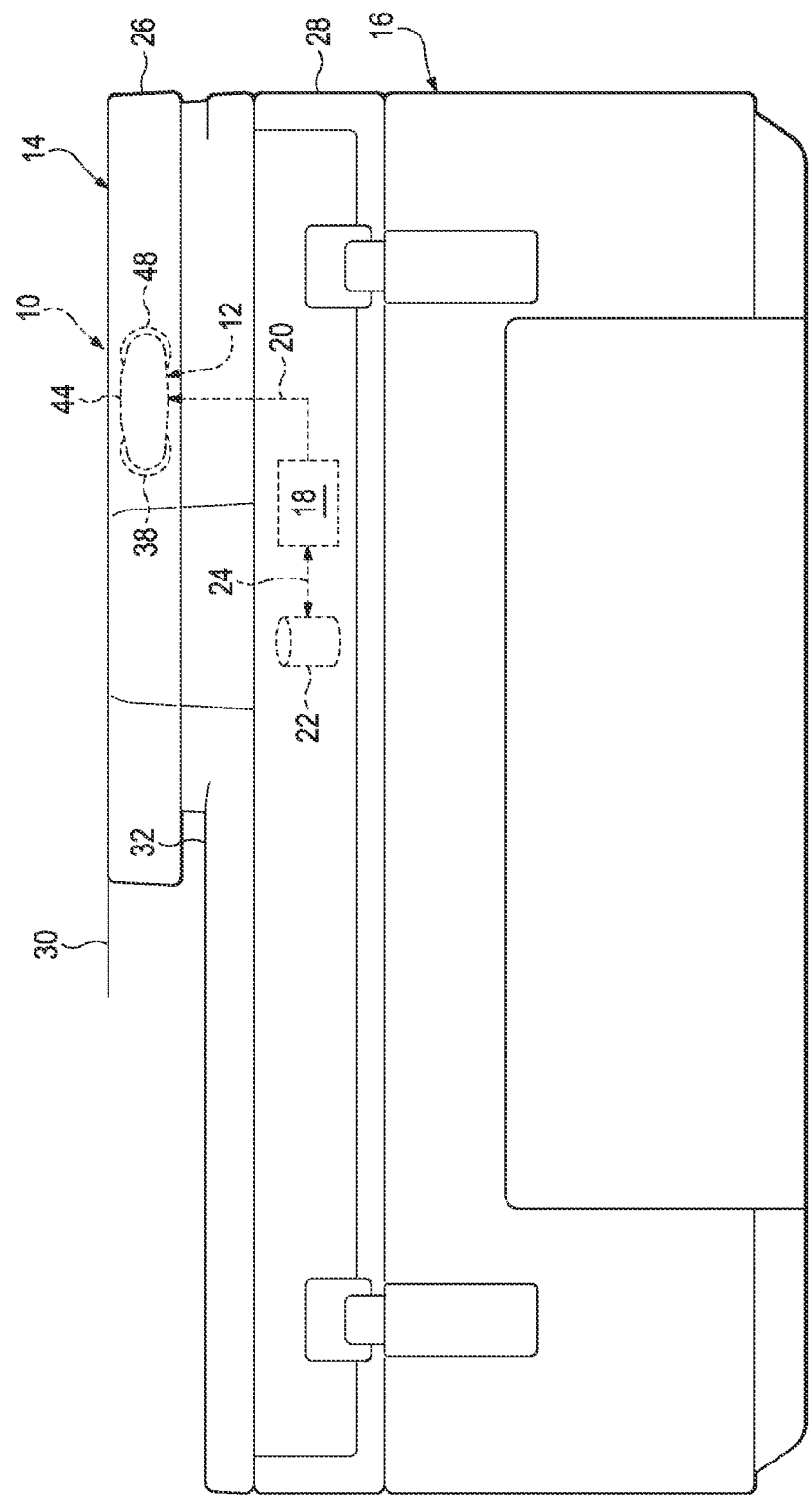
FIG. 1 is an example of an electronic device.

The apparatus or mechanism for raising and lowering the pick arm can be complex, expensive, and/or unreliable. It can also add to the overall size (e.g., height) of an automatic document feeder and, consequently, the electronic device with which it is associated. An apparatus or mechanism 10 directed to reducing the complexity, expense, reliability, and size of lowering and raising a pick arm 12 of an automatic document feeder 14 associated with an electronic device 16 is shown in FIG. 1. This is accomplished by decreasing the number of required components which results in a less complex and expensive design. In one example of apparatus or mechanism 10, overall system height was reduced from approximately 71 mm to 48 mm. Apparatus or mechanism 10 is additionally directed to helping increase the reliability of such lowering and raising of pick arm 12 by decreasing the number of required components which decreases required tolerance stack-up, thereby providing more accurate functioning.

As used herein, the terms "non-transitory storage medium" and non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a random access memory (RAM) or a read-only memory (ROM).

As used herein, the term "processor" is defined as including, but not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof.

As used herein, "electronic device" is defined as including, but not necessarily being limited to, a scanner, fax machine, multi-function printer, postal franking device, or peripheral. As used herein, "media stack" is defined as including, but not necessarily being limited to, one or more documents, sheets, or items of media in whatever form (e.g., letter size, legal size, A4, or 4"×6") that include text, images, photos, and/or data thereon to be processed (e.g., scanned, copied, or faxed) by electronic device 10. "Media stack" may additionally include one or more documents, sheets, or items of media in whatever form that may need other processing by electronic device 10, such as printing.

In the example shown in FIG. 1, electronic device 16 includes a multi-function printer that includes not only scanning capability, but also copying, faxing, and printing capabilities. Electronic device 16 includes a processor 18 that is coupled to apparatus or mechanism 10, as indicated by dashed arrow 20, to control operation thereof. Electronic device 16 additionally includes a non-transitory storage medium 22 that is coupled to processor 18, as indicated by dashed double-headed arrow 24. Non-transitory storage medium 22 includes instructions that, when executed by processor 18, cause processor 18 to control operation of apparatus or mechanism 10, as discussed more fully below. Processor 18 may additional write data to non-transitory storage medium 22 for later use or retrieval. Processor 18 may also control other components and/or operations of electronic device 16.

As can also be seen in FIG. 1, automatic document feeder 14 includes a housing 26 in which apparatus or mechanism 10 is disposed. Electronic device 16 additionally includes a housing 28 in which processor 18 and non-transitory storage medium 22 are disposed. Other components of the multi-function printer of electronic device 16 may also be disposed in housing 28, such as a printing mechanism or scanning mechanism (neither of which are shown).

As can further be seen in FIG. 1, automatic document feeder 14 of electronic device 16 includes an input tray or surface 30 on which documents may be placed for selection (also known as "picking") by apparatus or mechanism 10. Automatic document feeder 14 of electronic device 16 also includes an output tray or surface 32 on which documents are routed or placed for retrieval by one or more end-users subsequent to processing.

Figure 2:
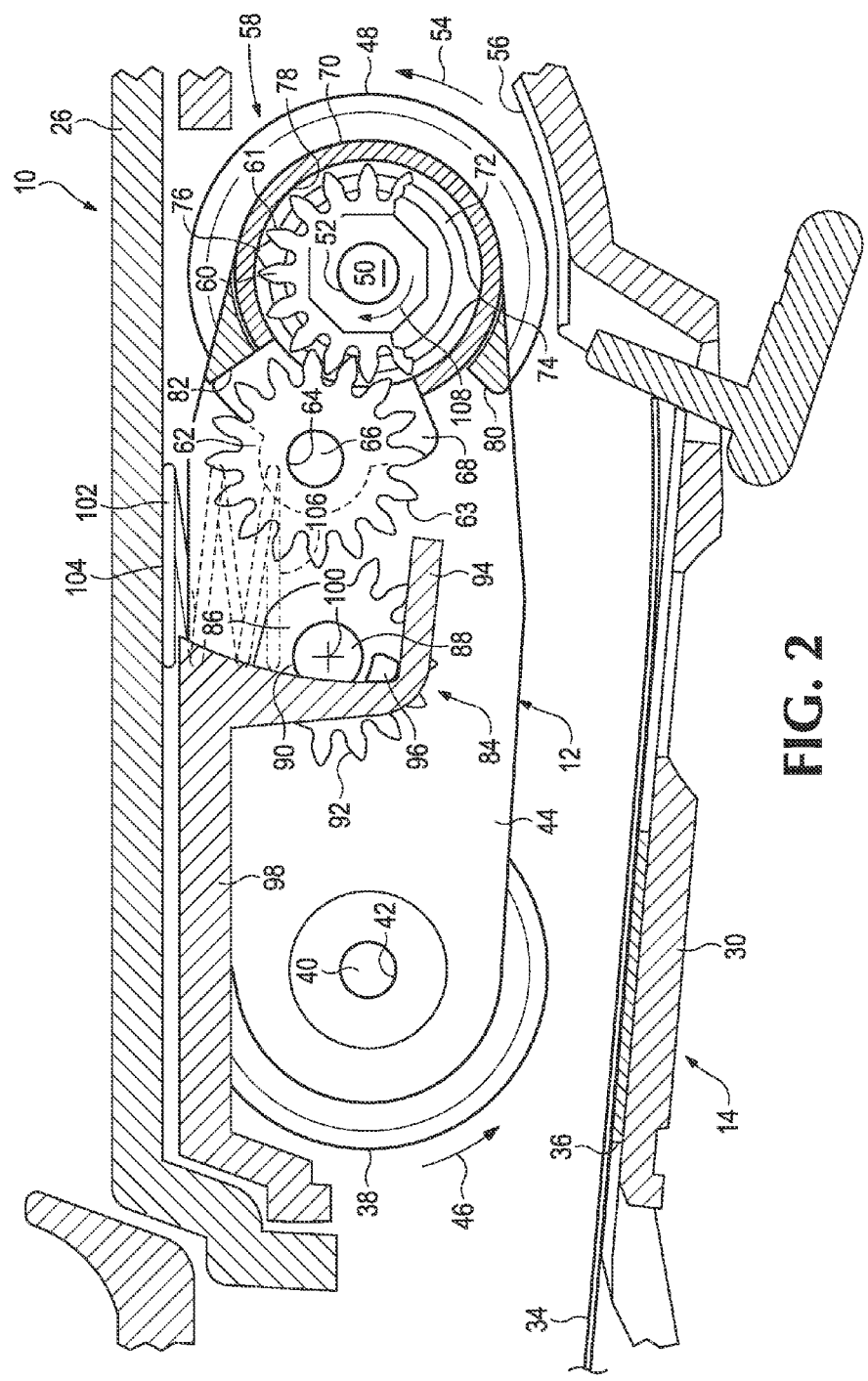
FIG. 2 is an example of a side view of an apparatus or mechanism for lowering and raising a pick arm of the electronic device of FIG. 1.

An example of a side view of apparatus or mechanism 10 for lowering and raising pick arm 12 is shown in FIG. 2. As can be seen in FIG. 2, an item or document 34 representative of a media stack has been placed in input tray 30. Input tray 30 includes a pad 36 adjacent document 34 and generally below pre-feed roller 38 of pick arm 12. In one example, pad 36 may be made from cork or other similar material and pre-feed roller 38 may be made from an elastomeric material, such as rubber. Pre-feed roller 38 is rotatably mounted to a shaft 40 that is disposed within an opening 42 defined by side member 44 of pick arm 12. Pre-feed roller 38 may be rotatably driven in the direction indicated by arrow 46 to select or "pick" document or item 34 with help provided from the resistance of pad 36 when pick arm 12 is lowered, as discussed more fully below.

Pick arm 12 additionally includes a separation roller 48 rotatably mounted to an input shaft 50 that is disposed within an opening 52 also defined by side member 44. Separation roller 48 may be driven in the direction indicated by arrow 54 to help separate or "singulate" document or item 34 from other items or documents within the media stack that may have been inadvertently selected by pre-feed roller 38 and pad 36. A retard pad 56 is located generally below separation roller 48 to help facilitate this "singulation" or separation. In one example, separation roller 48 and retard pad 56 may be made from an elastomeric material, such as rubber.

As can also be seen in FIG. 2, apparatus or mechanism 10 additionally includes a shuttle assembly 58 having a first direction of movement and a second direction of movement, as discussed more fully below. Shuttle assembly 58 includes an idler gear 60 having a clockwise direction of rotation and a counter-clockwise direction of rotation, based upon rotation of input shaft 50, which is discussed in more detail below. Shuttle assembly 58 also includes a shuttle gear 62 rotatably coupled to idler gear 60 so as to be driven thereby in either a clockwise or counter-clockwise direction, as also discussed more fully below. In this example, idler gear 60 includes a plurality of teeth 61 that mesh with a plurality of teeth 63 of shuttle gear 62 to provide this coupling.

As additionally can be seen in FIG. 2, shuttle gear includes an opening 64 through which a shaft 66 of a gear shuttle 68 is disposed to allow shuttle gear 62 to rotate. As can further be seen in FIG. 2, gear shuttle 68 includes a round portion or member 70 disposed around an O-ring structure 72 which is rotatably coupled to input shaft 50 so as to be driven thereby. O-ring structure 72 includes bumps or nipples 74 and 76 that frictionally engage inner perimeter 78 of round portion or member 70 of gear shuttle. This frictional engagement allows the rotation of O-ring structure 72 to drive or move gear shuttle 68 in both a first direction of movement and a second direction of movement which also provides shuttle gear 62 with a first direction of movement and a second direction of movement by virtue of the above-described coupling between the two.

The range of movement of gear shuttle 68 (and therefore shuttle gear 62) in the first direction is controlled or limited by lower stop 80. Similarly the range of movement of gear shuttle 68 (and therefore shuttle gear 62) in the second direction is controlled or limited by upper stop 82. In other examples of mechanism or apparatus 10, the locations of either or both of lower stop 80 and upper stop 82 may be changed in order to change (e.g. increase or decrease) the range of movement of gear shuttle 68 (and thus shuttle gear 62) in either or both the first direction and/or the second direction.

Apparatus or mechanism 10 for lowering and raising pick arm 12 additionally includes a lift assembly 84 that is rotatably coupled to shuttle assembly 58. Lift assembly 84 includes a lift gear 86 coupled to side member 44 via a shaft 88 thereof that is disposed through an opening 90 defined by lift gear 86. As illustrated and discussed more fully below, lift gear 86 is rotatably driven by shuttle gear 62 during both a first period of time as a result of movement of shuttle gear 62 in a first direction and a second period of time as a result of movement of shuttle gear 62 in a second direction. In the example shown in FIG. 2, lift gear 86 includes a plurality of teeth 92 that mesh with teeth 63 of shuttle gear 62 during both of these first and second periods of time to rotate lift gear 86 in a first direction during the first period and a second direction during the second period.

Lift assembly 84 additionally includes a lift hook 94 on which a cam 96 of mechanism or apparatus 10 travels. In this manner cam 96 is coupled to lift assembly 84 to transform rotary motion of lift assembly 84 into substantially linear motion that allows pick arm 12 to lower when shuttle assembly 58 is moved in the first direction from upper stop 82 to lower stop 80, as discussed more fully below. This coupling also allows cam 96 also transform rotary motion of lift assembly 84 into substantially linear motion that raises pick arm 12 when shuttle assembly 58 is moved in the second direction from lower stop 80 to upper stop 82, as also discussed more fully below. In the example, lift assembly 84 is formed from and is part of upper case part 98 of housing 26.

In the illustrated example of apparatus or mechanism 10, cam 96 is coupled to lift gear 86 so as to be offset from a center 100 of lift gear 86. In other examples, however, it may be coupled to lift gear 86 in a different position. As can also be seen, in this example, cam 96 has a generally trapezoidal cross-section. In other examples, however, cam 96 may have a differently shaped cross-section (e.g., elliptical, oval, circular, triangular, etc.).

Mechanism or apparatus 10 further includes a biasing member 102 coupled on one end 104 to housing 26 and on another end 106 to pick arm 12. Biasing member 102 helps to urge pick arm 12 to lower from the raised position shown, for example, in FIG. 2. In this example, biasing member 102 includes a spring 108 that is compressed when pick arm 12 is raised.

As can be seen in FIG. 2, input shaft 50 is rotating in a clockwise direction, generally indicated by arrow 108. This direction of rotation of shaft 50 maintains pick arm 12 in the raised or upwards dwell position shown in FIG. 2. Input shaft 50 may be rotated endlessly in this direction of arrow 108 to maintain pick arm 12 in this position. Input shaft 50 is rotated by a motor (not shown) and optional gear train assembly (also not shown) controlled by processor 18. Pick arm 12 will remain in this dwell state, acting against the urging of compressed biasing member 102 and gravity, until input shaft 50 is rotated in a counter-clock wise direction, generally opposite the direction indicated by arrow 108, which begins the actuation of mechanism or apparatus 10 to lower pick 12, as illustrated below.

Several different types of materials may be used to construct the elements or components of apparatus or mechanism 10. For example, O-ring structure 72 may be made from an elastomeric material, such as rubber, and side member 44 may be made from metal or a polymer, such as plastic. An another example, idler gear 60, shuttle gear 62, gear shuttle 68, lift gear 86, lift hook 94, and cam 96 may be made from metal, ceramic, polymer, or composite materials.

Figure 3:
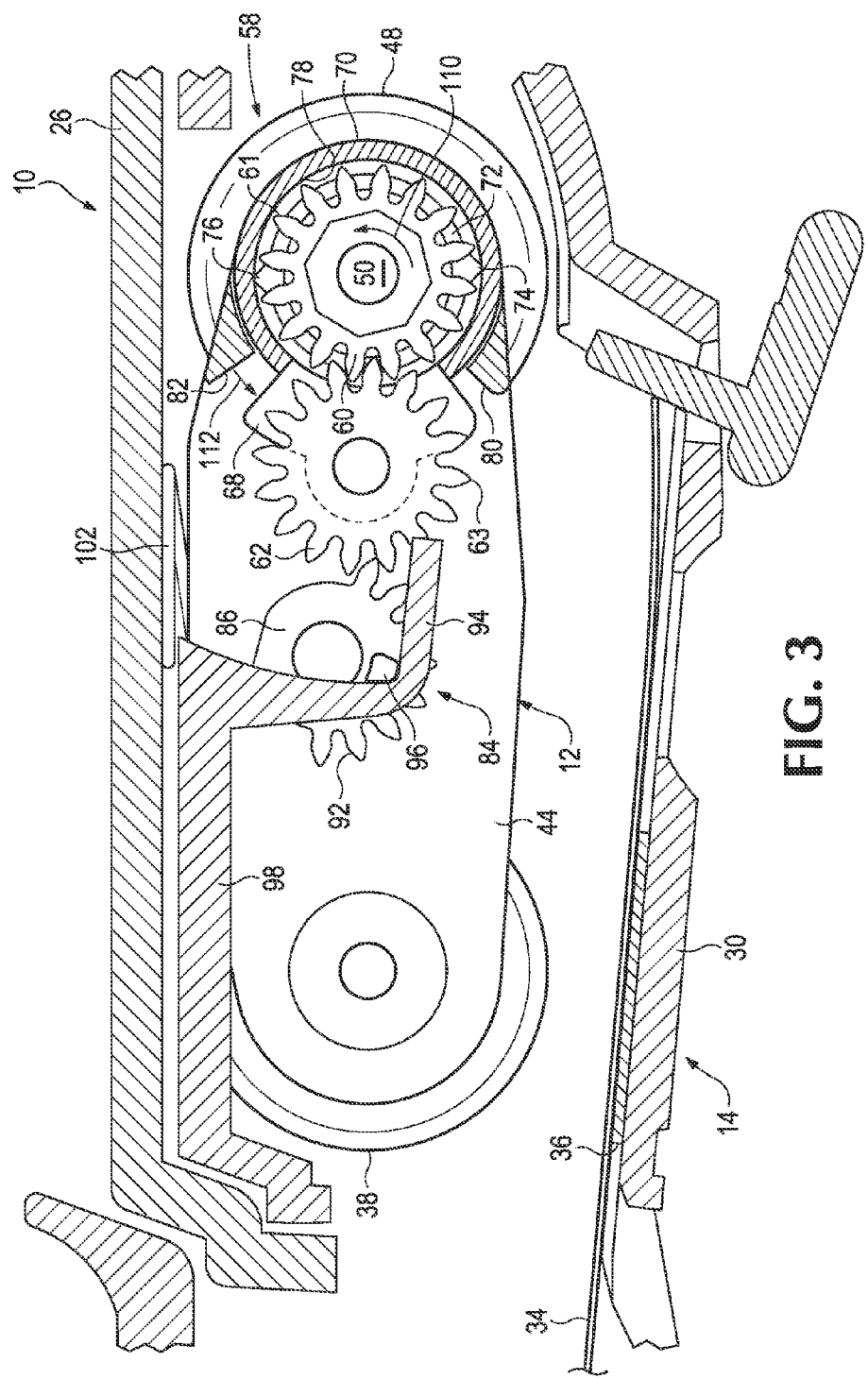
FIG. 3 is an example of a side view of the apparatus or mechanism of FIG. 2 beginning to lower the pick arm of the electronic device of FIG. 1.

An example of a side view of apparatus or mechanism 10 beginning to lower pick arm 12 of automatic document feeder 14 of electronic device 16 is shown in FIG. 3. As can be seen in FIG. 3, input shaft 50 is now rotated in a counter-clockwise direction, generally indicated by arrow 110. Gear shuttle 68 is in turn influenced by the friction created between bumps or nipples 74 and 76 of O-ring structure 72 and inner perimeter 78 of round portion or member 70. This causes gear shuttle 68 to begin to move off of or away from upper stop 82 in a first direction, generally indicated by arrow 112. As can also be seen in FIG. 3, shuttle gear 62 also moves in the first direction indicated by arrow 112. As can further be seen in FIG. 3, teeth 63 of shuttle gear 62 have also entered mesh with teeth 92 of lift gear 86.

Figure 4:
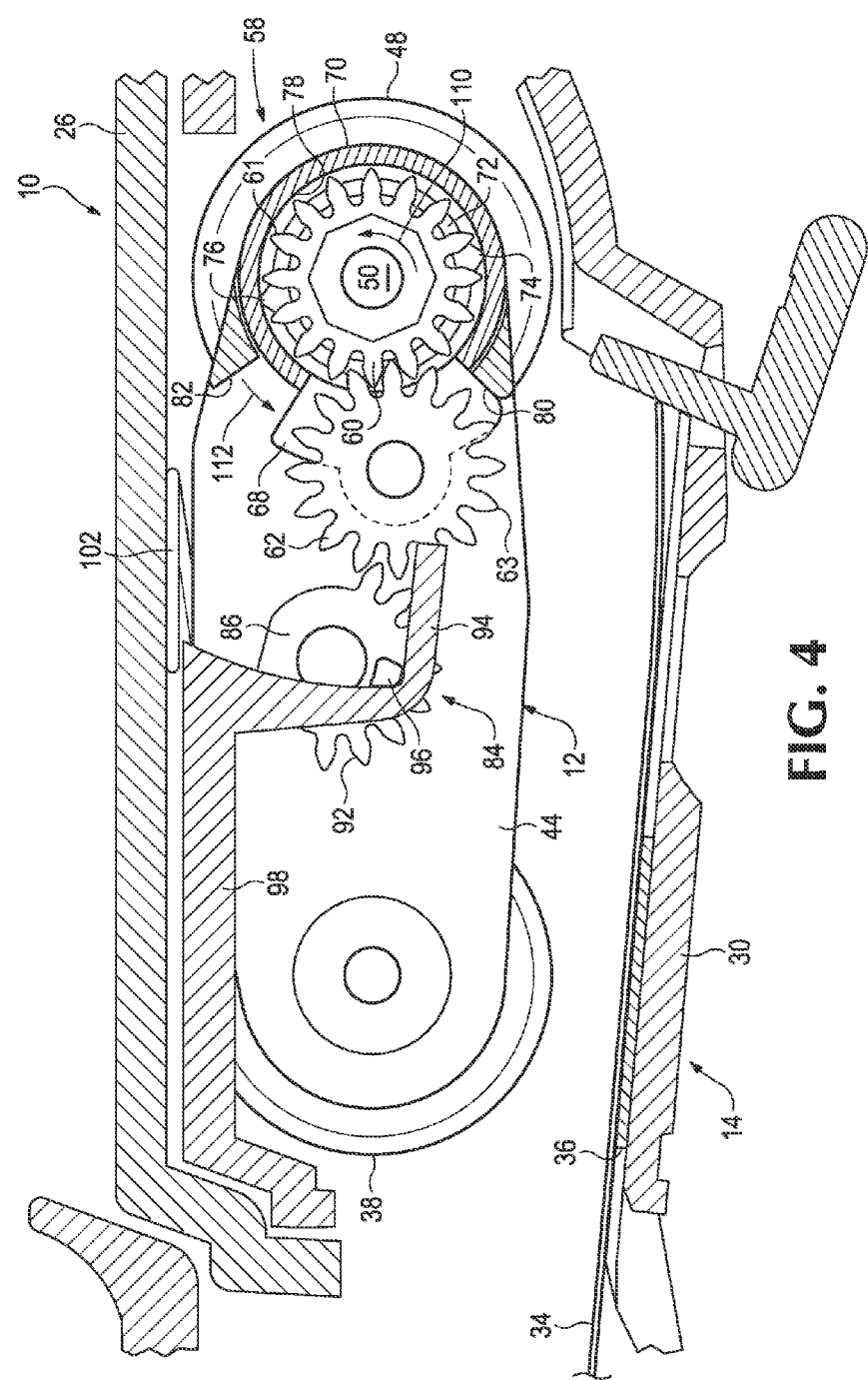
FIG. 4 is an example of a side view of the apparatus or mechanism of FIG. 3 continuing to begin to lower the pick arm of the electronic device of FIG. 1.

An example of a side view of apparatus or mechanism 10 continuing to begin to lower pick arm 12 of automatic document feeder 14 of electronic 16 is shown in FIG. 4. As can be seen in FIG. 4, input shaft 50 continues to rotate in a counter-clockwise direction, generally indicated by arrow 110, which causes gear shuttle 68 to continue to move away from upper stop 82 in first direction 112. As can also be seen in FIG. 4, shuttle gear 62 also continues to move in the first direction indicated by arrow 112. As illustrated, gear shuttle 68 eventually reaches lower stop 80 which causes gear shuttle 68 and shuttle gear 62 to both cease further movement in first direction 112.

Figure 5:
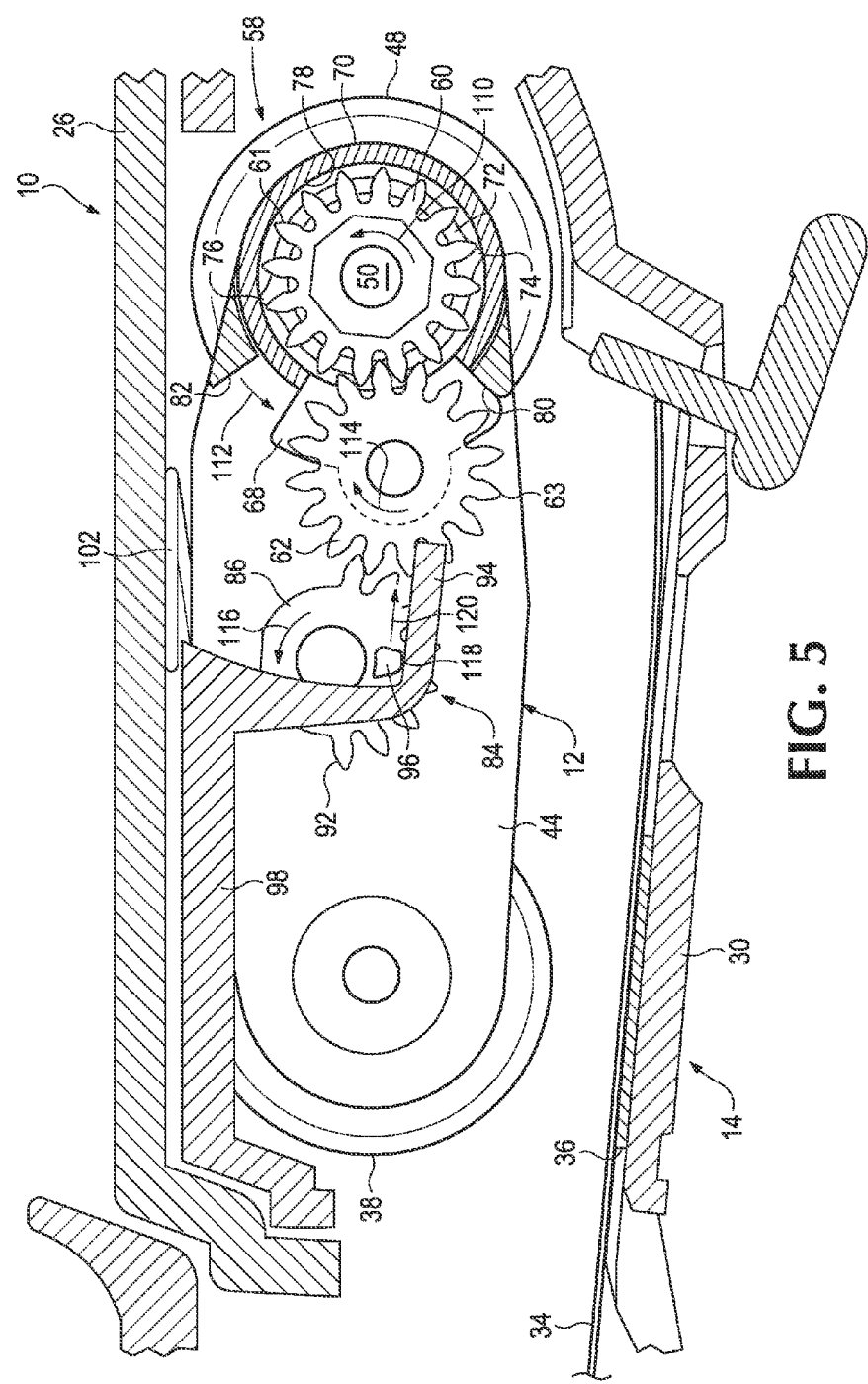
FIG. 5 is an example of a side view of the apparatus or mechanism of FIG. 4 additionally continuing to begin to lower the pick arm of the electronic device of FIG. 1.

An example of a side view of apparatus or mechanism 10 additionally continuing to begin to lower pick arm 12 of automatic document feeder 14 of electronic device 16 is shown in FIG. 5. As can be seen in FIG. 5, input shaft 50 continues to rotate in a counter-clockwise direction, generally indicated by arrow 110, but no further movement of either gear shuttle 68 or shuttle gear 62 occurs because of lower stop 80 which impedes such further movement in the first direction of arrow 112. Instead rotation of input shaft 50 in the direction of arrow 110 now causes idler gear 60 to rotate in the counter-clockwise direction, generally indicated by arrow 110, by virtue of the rotational coupling between input shaft 50 and idler gear 60. This, in turn, causes shuttle gear 62 to rotate in a clockwise direction, generally indicated by arrow 114, by virtue of the coupling between idler gear 60 and shuttle gear 62 due to the meshing of respective teeth 61 and 63 thereof.

As can also be seen in FIG. 5, during this first period of time, rotation of shuttle gear 62 in the clockwise direction of arrow 114, causes lift gear 86 to rotate in a first direction, generally indicated by arrow 116, by virtue of the coupling between shuttle gear 62 and lift gear 86 due to the meshing of respective teeth 63 and 92 thereof. In this example, this first direction 116 of rotation of lift gear 86 is generally opposite the direction of rotation 114 of shuttle gear 62. In this case, first direction of rotation 116 is counter-clockwise. As can additionally be seen in FIG. 5, rotation of lift gear 86 in the counter-clockwise direction of arrow 116, causes first surface 118 of cam 96 to begin to move along lift hook 94 of lift assembly 84 in a linear direction, generally indicated by arrow 120. In this manner, cam 96 transforms or converts the rotary motion of lift assembly 84 into substantially linear motion that allows pick arm 12 to lower when shuttle assembly 58 is moved in first direction 112.

Figure 6:
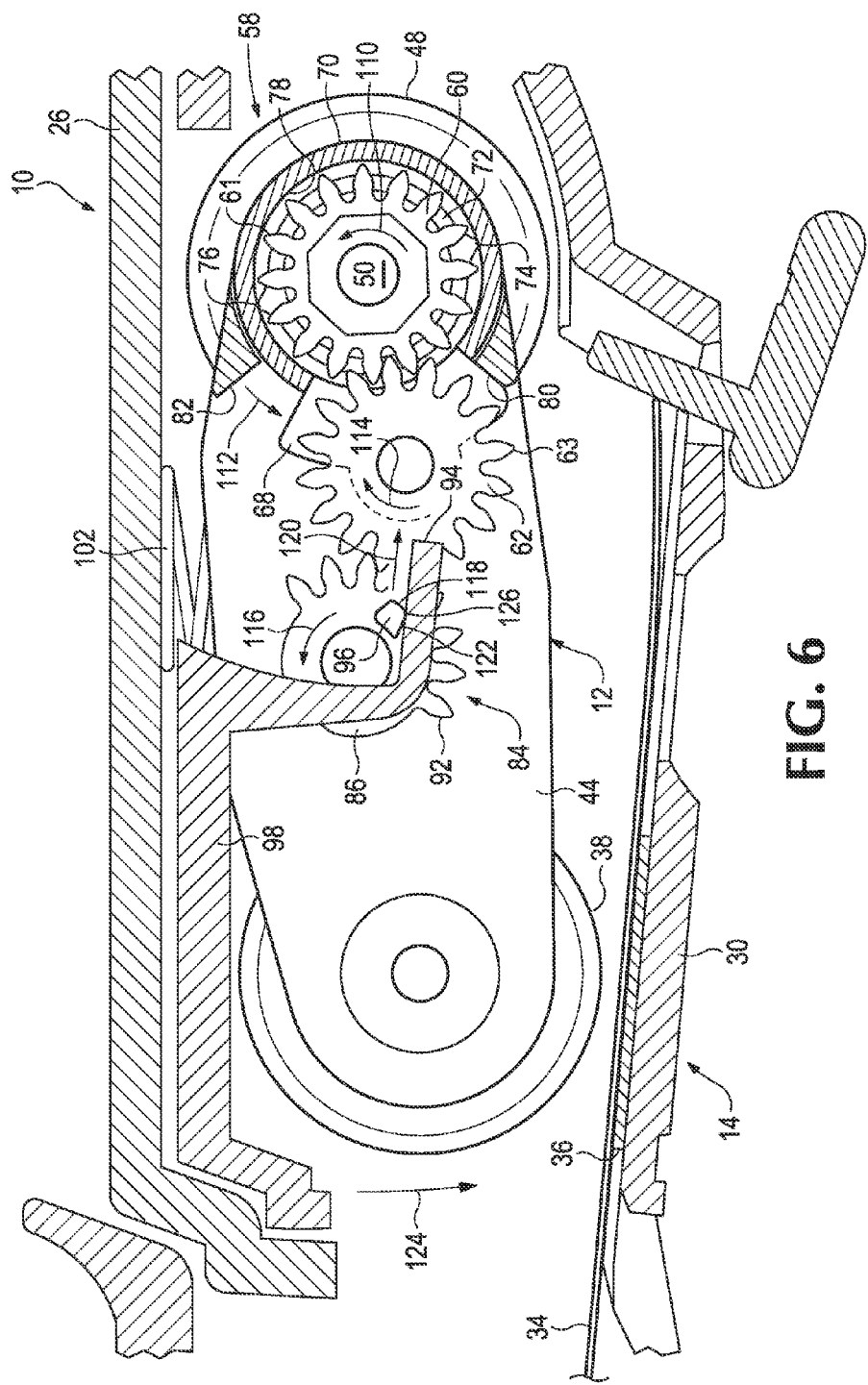
FIG. 6 is an example of a side view of the apparatus or mechanism of FIG. 5 lowering the pick arm of the electronic device of FIG. 1.

An example of a side view of apparatus or mechanism 10 of FIG. 5 lowering pick arm 12 of automatic document feeder 14 of electronic device 16 is shown in FIG. 6. As can be seen in FIG. 6, input shaft 50 continues to rotate in a counter clockwise direction, generally indicated by arrow 110, but further movement of either gear shuttle 68 or shuttle tear 62 still does not occur because of lower stop 80, which impedes such further movement in the direction of arrow 112. Instead rotation of input shaft 50 in the direction of arrow 110 continues to cause idler gear 60 to rotate in the counter-clockwise direction, generally indicated by arrow 110 which, in turn, causes shuttle gear 62 to rotate in a clockwise direction, generally indicated by arrow 114, as discussed above.

As also discussed above, rotation of shuttle gear 62 in the clockwise direction of arrow 114, causes lift gear 86 to rotate in a first direction, generally indicated by arrow 116, which causes first surface 118 of cam 96 to continue to linearly move along lift hook 94 of lift assembly 84 in the direction of arrow 120 until it reaches a "tipping" point where first surface 118 of cam 96 ceases to move along lift hook 94 and second surface 122 of cam 96 instead begins to move along lift hook 94, as shown in FIG. 6. This allows pick arm 12 to lower, in the direction generally indicated by arrow 124, toward item or document 34 in input tray 30 under the urging of biasing member 102 and the influence of gravity.

Second surface 122 of cam 96 is designed to help pick arm 12 lower in the direction of arrow 124 in a controlled manner so as to help prevent damage to document or item 34, pad 36, input tray 30, and/or pre-feed roller 38. Second surface 122 of cam 96 may also be designed to help pick arm 12 lower in the direction of arrow 124 in a controlled manner so as to help lower acoustical noise associated with pre-feed roller 38 contacting item or document 34, pad 36, and input tray 30. As also shown in FIG. 6, cam 96 may include a generally rounded transition or surface 126 to further help pick arm 12 lower in this controlled manner.

Figure 7:
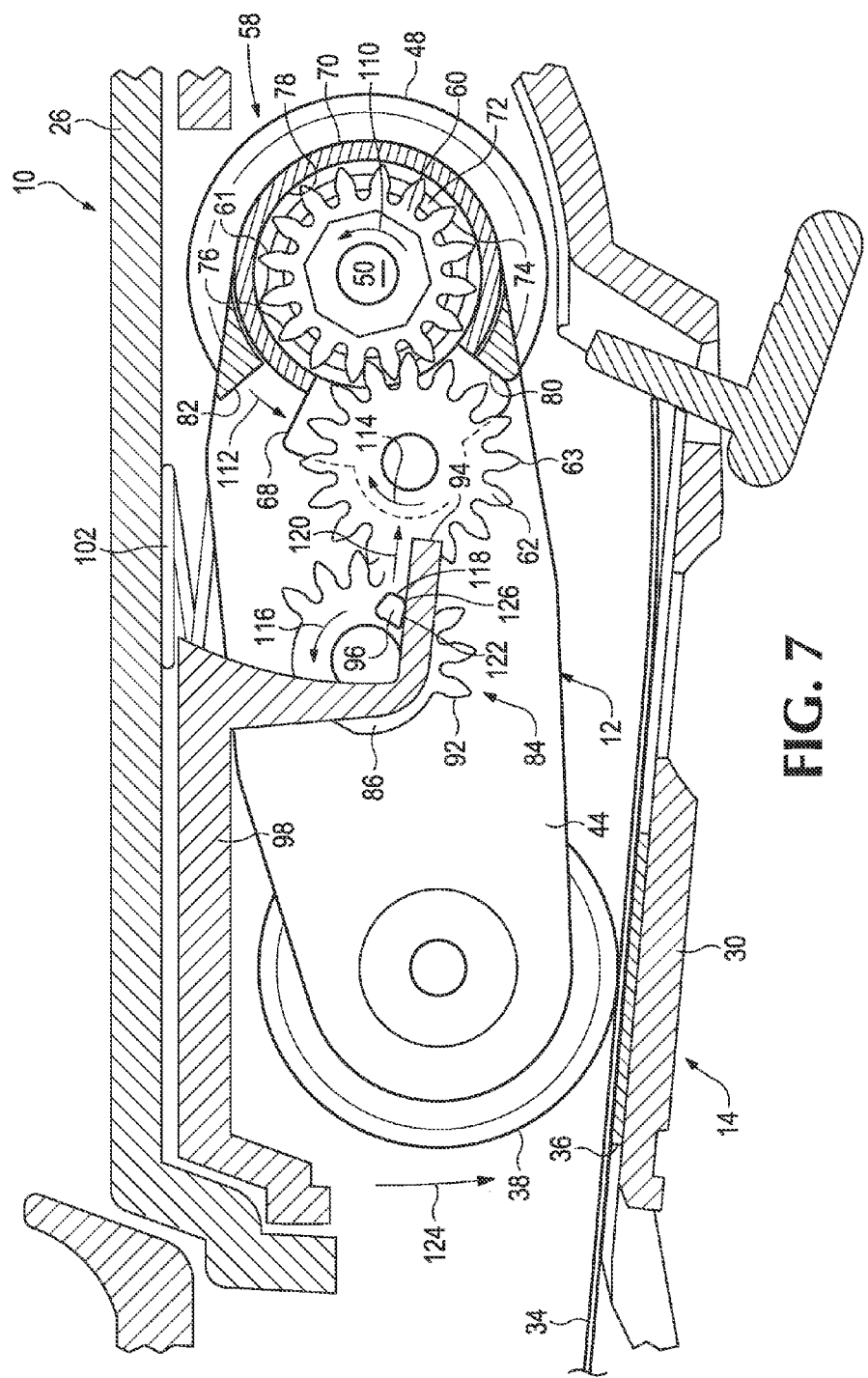
FIG. 7 is an example of a side view of the pick arm of the electronic device of FIG. 1 in a completely lowered position.

An example of a side view of pick arm 12 of automatic document feeder 14 of electronic device 16 of FIG. 1 in a completely lowered position is shown in FIG. 7. As can be seen in FIG. 7, input shaft 50 continues to rotate in a counter clockwise direction, generally indicated by arrow 110, but further movement of either gear shuttle 68 or shuttle gear 62 continue not to occur because of lower stop 80, which impedes such further movement in the direction of arrow 112. Instead rotation of input shaft 50 in the direction of arrow 110 continues to cause idler gear 60 to rotate in the counter-clockwise direction, generally indicated by arrow 110 which, in turn, causes shuttle gear 62 to rotate in a clockwise direction, generally indicated by arrow 114, as discussed above.

As also discussed above, rotation of shuttle gear 62 in the clockwise direction of arrow 114, causes lift gear 86 to rotate in the first direction, generally indicated by arrow 116, which causes second surface 122 of cam 96 to continue to linearly move along lift hook 94 of lift assembly 84 in the direction of arrow 120 which allows pick arm 12 to completely lower, in the direction generally indicated by arrow 124, so that pre-feed roller 38 is adjacent and touching item or document 34 in input tray 30.

Figure 8:
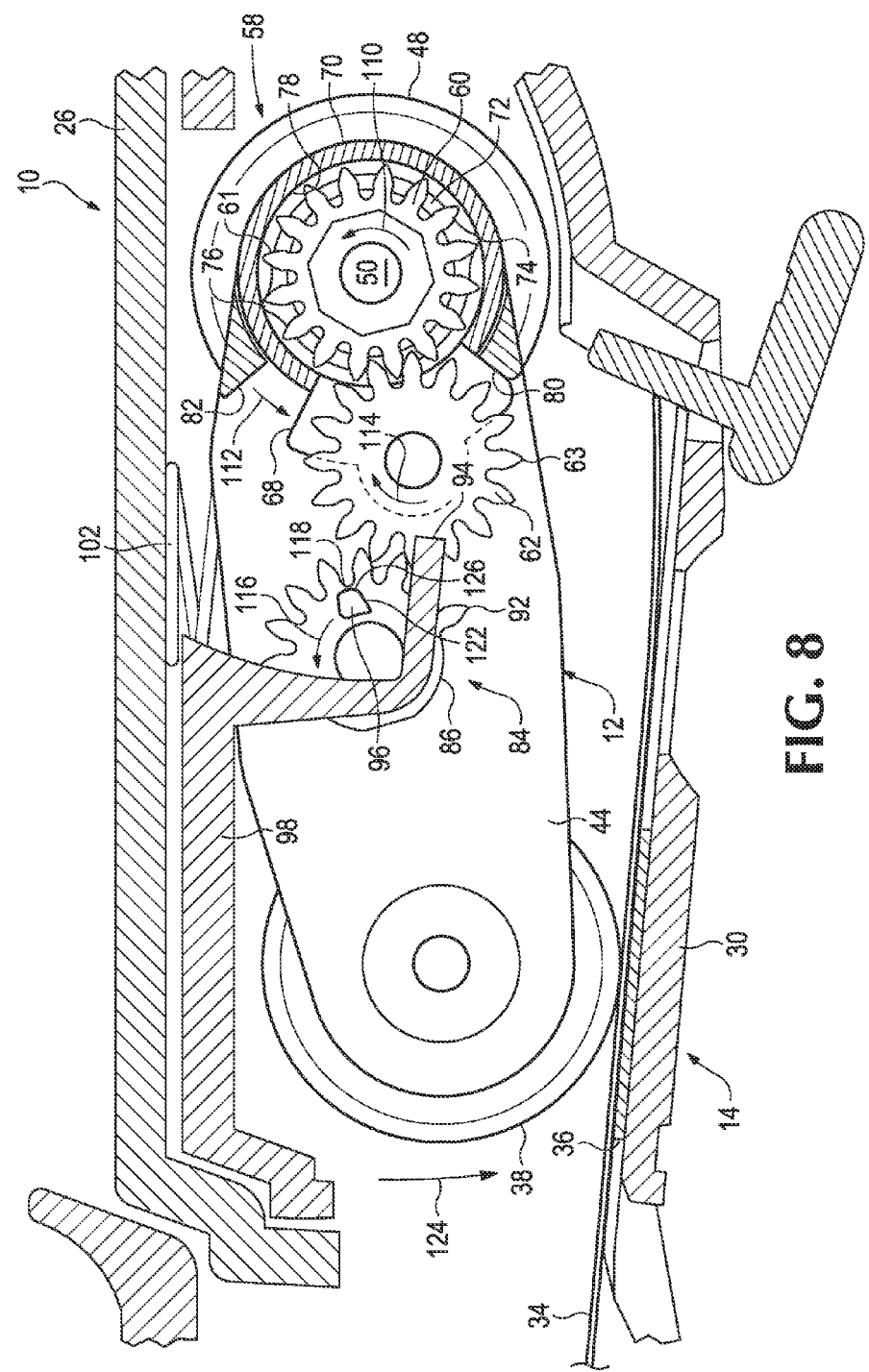
FIG. 8 is an example of an additional side view of the pick arm of the electronic device of FIG. 1 in a completely lowered position and the apparatus or mechanism of FIG. 6 disengaged therefrom.

Another example of a side view of pick arm 12 of automatic document feeder 14 of electronic device 16 of FIG. 1 in a completely lowered position, with apparatus or mechanism 10 disengaged therefrom, is shown in FIG. 8. As can be seen in FIG. 8, input shaft 50 continues to rotate in a counter clockwise direction, generally indicated by arrow 110, but further movement of either gear shuttle 68 or shuttle gear 62 continue not to occur because of lower stop 80, which impedes such further movement in the direction of arrow 112. Instead, rotation of input shaft 50 in the direction of arrow 110 continues to cause idler gear 60 to rotate in the counter-clockwise direction, generally indicated by arrow 110, which, in turn, causes shuttle gear 62 to rotate in a clockwise direction, generally indicated by arrow 114, as discussed above.

Rotation of shuttle gear 62 in the clockwise direction of arrow 114 continues to cause lift gear 86 to rotate in the first direction, generally indicated by arrow 116, which, at this point, has now caused second surface 122 of cam 96 to move away from lift hook 94 of lift assembly 84 and follow the general direction of arrow 116, as shown in FIG. 8.

Figure 9:
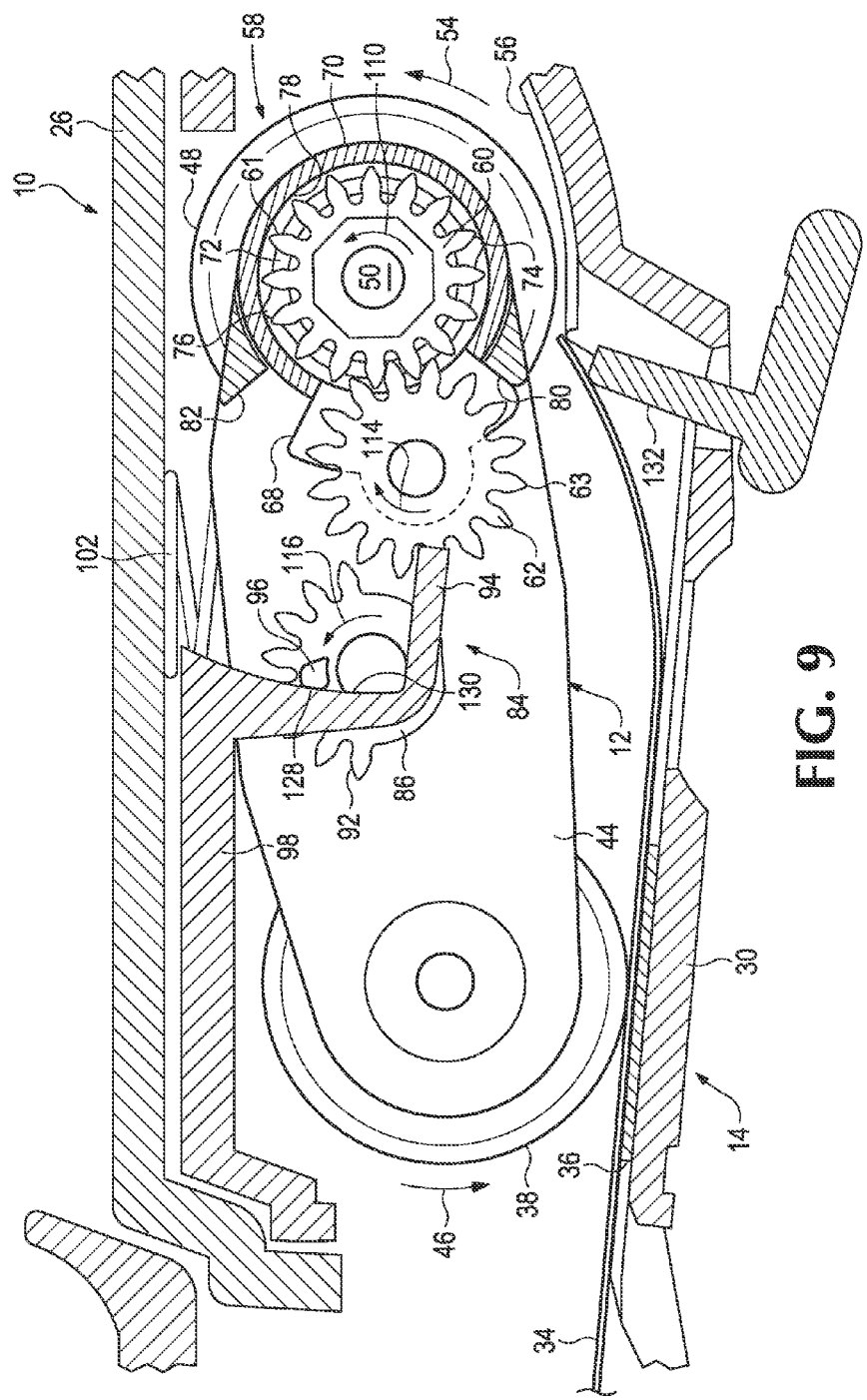
FIG. 9 is an example of a side view of the pick arm of the electronic device of FIG. 1 selecting an item or document from a media stack.

An example of a side view of pick arm 12 of automatic document feeder 14 of electronic device 16 of FIG. 1 selecting an item or document 34 from a media stack is shown in FIG. 9. As can be seen in FIG. 9, input shaft 50 continues to rotate in a counter clockwise direction, generally indicated by arrow 110, but further movement of either gear shuttle 68 or shuttle gear 62 continue not to occur because of lower stop 80, which impedes such further movement in the direction of arrow 112. Input shaft 50 may be rotated endless in this direction of arrow 110 to maintain pick arm 12 in this lowered or downwards dwell position selecting or "picking" one or more items or documents 34 from the media stack, as discussed more fully below. Rotation of input shaft 50 in the direction of arrow 110 continues to cause idler gear 60 to rotate in the counter-clockwise direction, generally indicated by arrow 110, which, in turn, causes shuttle gear 62 to rotate in a clockwise direction, generally indicated by arrow 114, as discussed above.

Rotation of shuttle gear 62 in the clockwise direction of arrow 114 ceases to cause lift gear 86 to rotate in first direction 116 because respective teeth 63 and 92 thereof are no longer meshed. Instead, third surface 128 of cam 96 is adjacent surface 130 of lift hook 94, and lift gear 86 has stopped rotating and come to rest. Instead, pre-feed roller 38 is rotated by a motor (not shown) and an optional gear train assembly (also not shown), controlled by processor 18, in the direction of arrow 46. This rotation, in conjunction with pad 36, selects or "picks" document or item 34 from the media stack and advances it towards wall 132 of input tray 30 where it is deflect upward or toward separation roller 48 and retard pad 56.

As can also be seen in FIG. 9, separation roller 48 is rotated by the same or a different motor (additionally not shown) and an optional gear train assembly (further not shown), controlled by processor 18, in the direction of arrow 54. This rotation, in conjunction with retard pad 56, separates or "singulates" item or document 34 from any others that were previously inadvertently "picked" or selected by pre-feed roller and pad 36. Document or item 34 is then processed by electronic device 10 and subsequently routed to output tray 32 (see FIG. 1) for retrieval by an end user.

Figure 10:
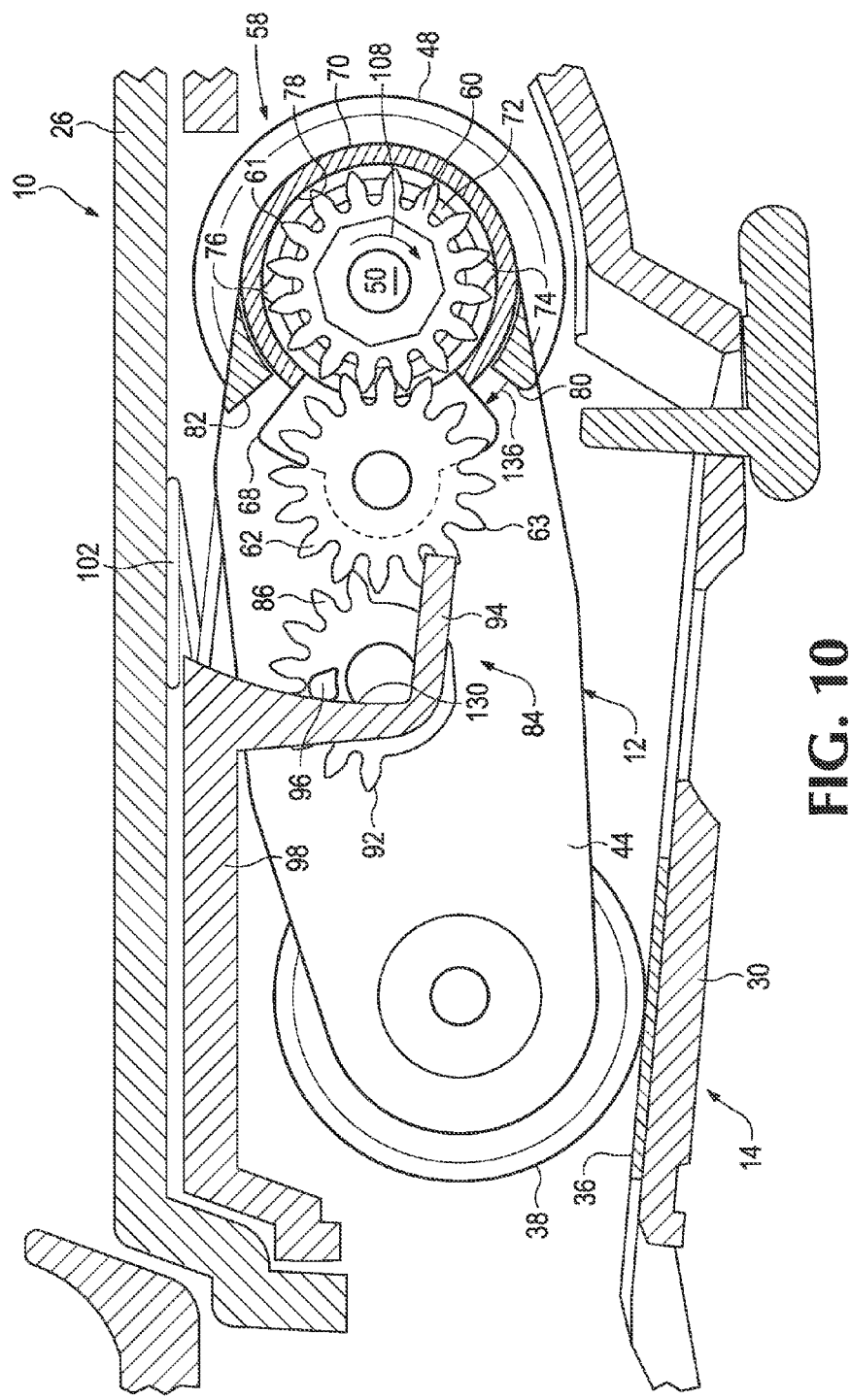
FIG. 10 is an example of a side view of the apparatus or mechanism of FIG. 2 beginning to raise the pick arm of the electronic device of FIG. 1.

An example of a side view of apparatus or mechanism 10 beginning to raise pick arm 12 of the automatic document feeder 14 of electronic device 16 is shown in FIG. 10. As can be seen in FIG. 10, input shaft 50 is now rotated in a clockwise direction, generally indicated by arrow 108. Gear shuttle 68 is in turn influenced by the friction created between bumps or nipples 74 and 76 of O-ring structure 72 and inner perimeter 78 of round portion or member 70. This causes gear shuttle 68 to begin to move off of or away from lower stop 80 in a second direction, generally indicated by arrow 136. As can also be seen in FIG. 10, shuttle gear 62 also moves in the first direction indicated by arrow 136.

Figure 11:
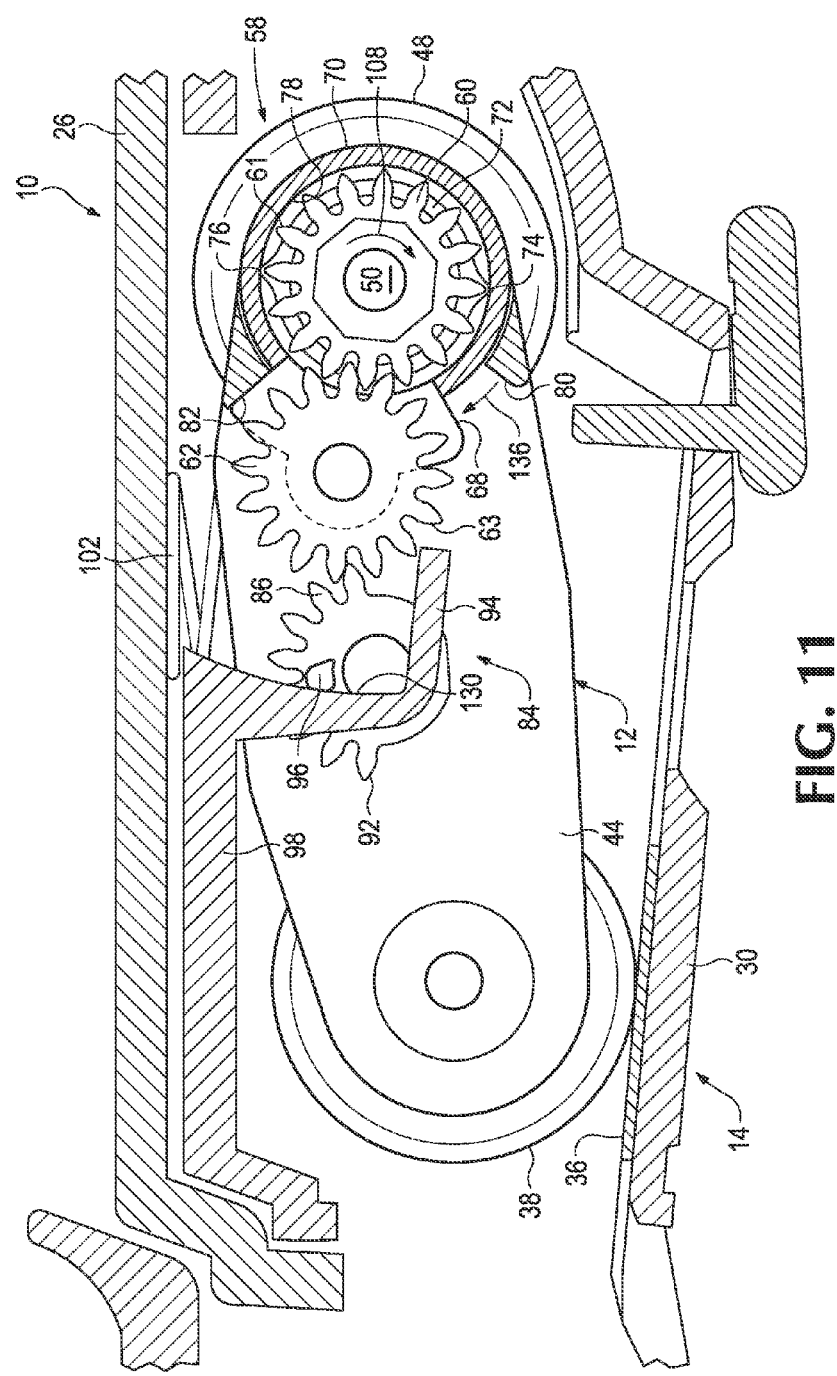
FIG. 11 is an example of a side view of the apparatus or mechanism of FIG. 10 continuing to begin to raise the pick arm of the electronic device of FIG. 1.

An example of a side view of apparatus or mechanism 10 continuing to begin to raise pick arm 12 of automatic document feeder 14 of electronic 16 is shown in FIG. 11. As can be seen in FIG. 11, input shaft 50 continues to rotate in a clockwise direction, generally indicated by arrow 108, which causes gear shuttle 68 to continue to move away from lower stop 80 in second direction 136. As can also be seen in FIG. 11, shuttle gear 62 also continues to move in the second direction indicated by arrow 136. As illustrated, gear shuttle 68 eventually reaches upper stop 82 which causes gear shuttle 68 and shuttle gear 62 to both cease further movement in second direction 136.

Figure 12:
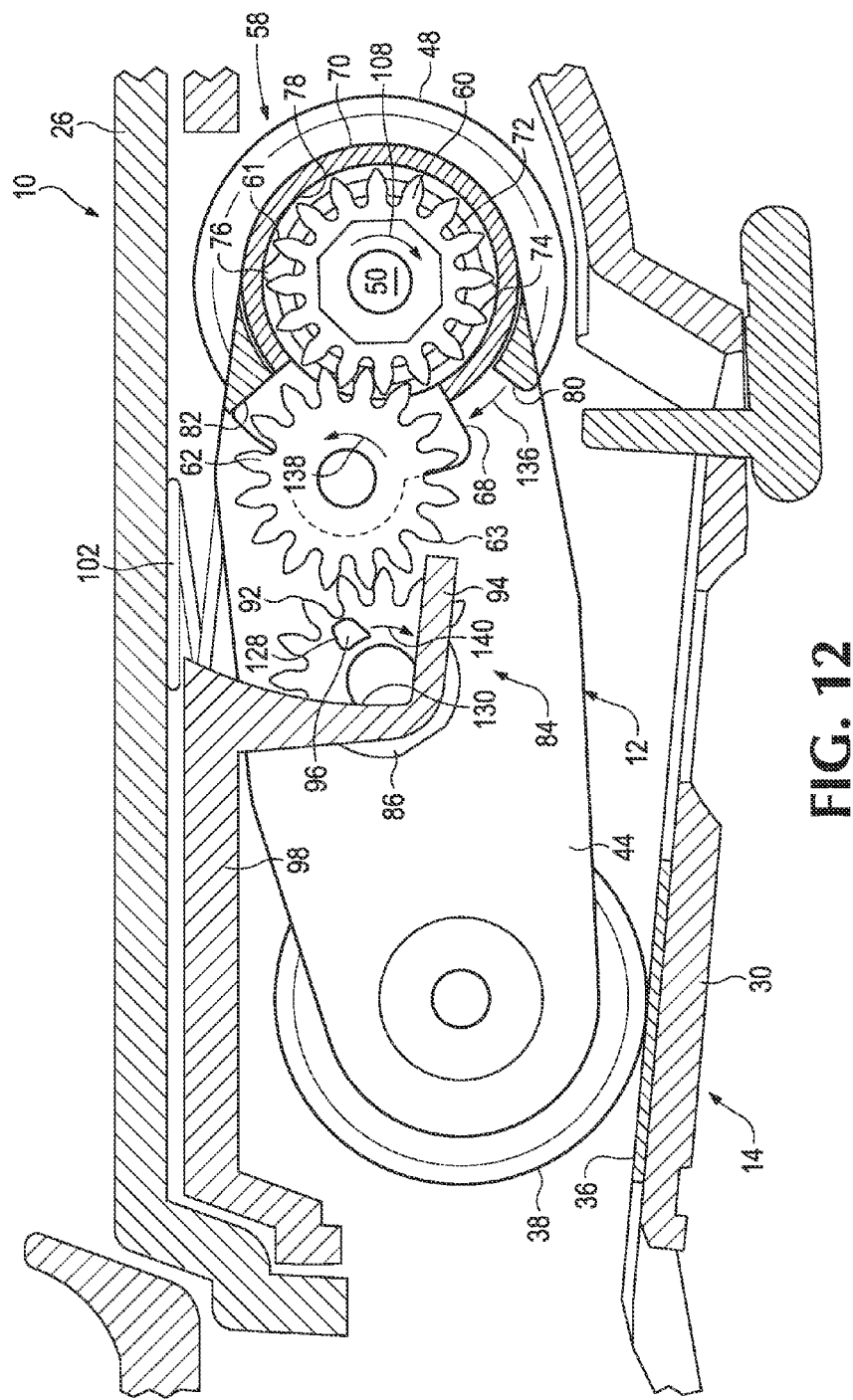
FIG. 12 is an example of a side view of the apparatus or mechanism of FIG. 11 additionally continuing to begin to raise the pick arm of the electronic device of FIG. 1.

An example of a side view of apparatus or mechanism 10 additionally continuing to begin to raise pick arm 12 of automatic document feeder 14 of electronic device 16 is shown in FIG. 12. As can be seen in FIG. 12, input shaft 50 continues to rotate in a clockwise direction, generally indicated by arrow 108, but no further movement of either gear shuttle 68 or shuttle tear 62 occurs because of upper stop 82, which impedes such further movement in the second direction of arrow 136. Instead rotation of input shaft 50 in the direction of arrow 108 now causes idler gear 60 to rotate in the clockwise direction, generally indicated by arrow 108, by virtue of the rotational coupling between input shaft 50 and idler gear 60. This, in turn, causes shuttle gear 62 to rotate in a counter-clockwise direction, generally indicated by arrow 138, by virtue of the coupling between idler gear 60 and shuttle gear 62 due to the meshing of respective teeth 61 and 63 thereof.

As can also be seen in FIG. 12, during this second period of time, rotation of shuttle gear 62 in the counter-clockwise direction of arrow 138, causes lift gear 86 to rotate in a second direction, generally indicated by arrow 140, by virtue of the coupling between shuttle gear 62 and lift gear 86 due to the meshing of respective teeth 63 and 92 thereof. In this example, this second direction 140 of rotation of lift gear 86 is generally opposite the direction of rotation 138 of shuttle gear 62. In this case, second direction of rotation 140 is clockwise. As can additionally be seen in FIG. 12, rotation of lift gear 86 in the clockwise direction of arrow 140, causes third surface 128 of cam 96 to begin to move away surface 130 of lift hook 94, as also generally indicated by arrow 140.

Figure 13:
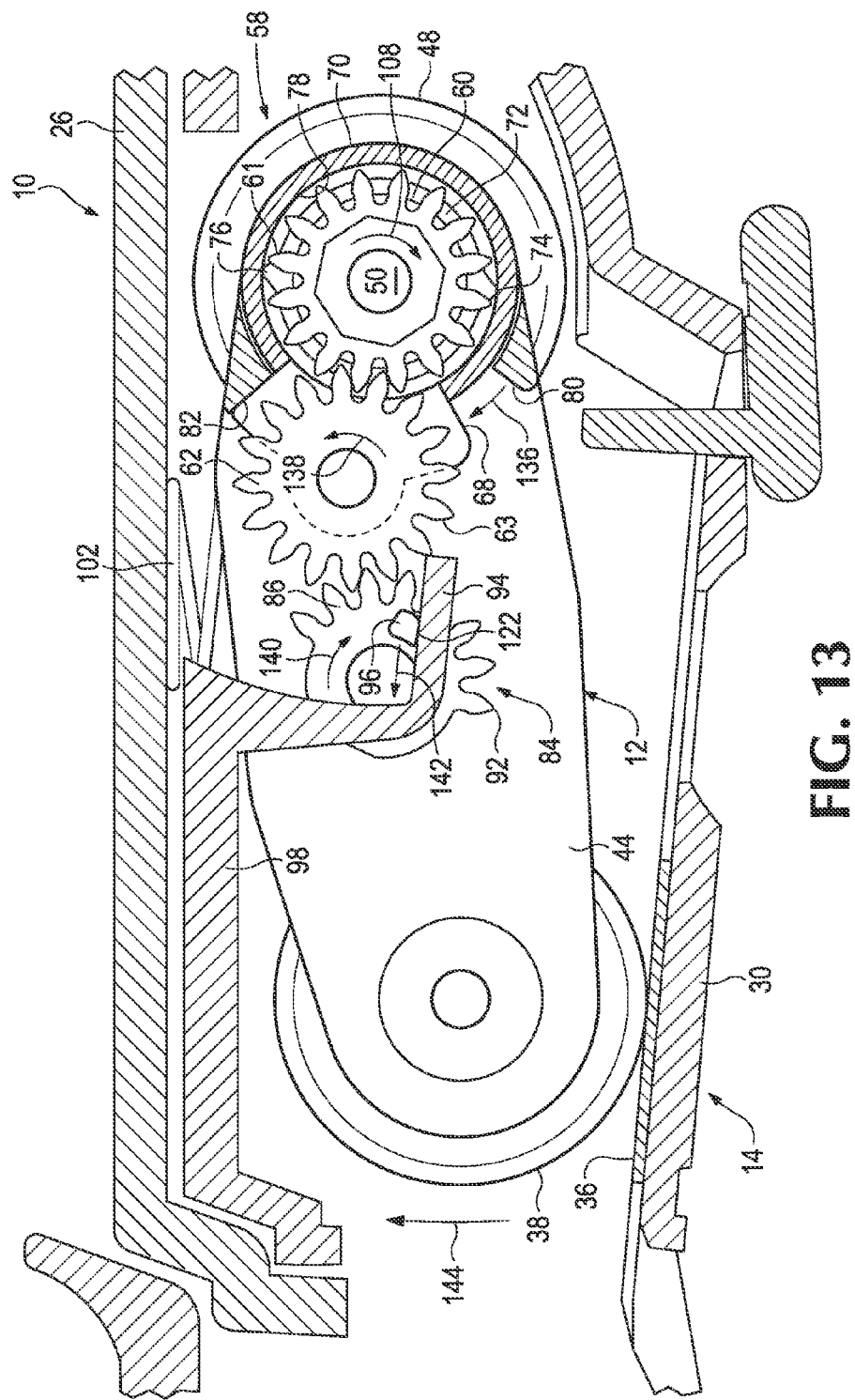
FIG. 13 is an example of a side view of the apparatus or mechanism of FIG. 12 raising the pick arm of the electronic device of FIG. 1.

An example of a side view of apparatus or mechanism 10 raising pick arm 12 of automatic document feeder 14 of electronic device 16 is shown in FIG. 13. As can be seen in FIG. 13, input shaft 50 continues to rotate in a clockwise direction, generally indicated by arrow 108, but further movement of either gear shuttle 68 or shuttle gear 62 still does not occur because of upper stop 82 which impedes such further movement in the direction of arrow 136. Instead, rotation of input shaft 50 in the direction of arrow 108 continues to cause idler gear 60 to rotate in the clockwise direction, generally indicated by arrow 108 which, in turn, causes shuttle gear 62 to rotate in a counter-clockwise direction, generally indicated by arrow 138, as discussed above.

As also discussed above, rotation of shuttle gear 62 in the counter-clockwise direction of arrow 138, causes lift gear 86 to rotate in the second direction, generally indicated by arrow 140, which now has caused second surface 122 of cam 96 to begin to again linearly move along lift hook 94 of lift assembly 84, this time in direction of arrow 142, which is generally opposite the previous direction of movement, generally indicated by arrow 120. In this manner, cam 96 again transforms or converts the rotary motion of lift assembly 84 into substantially linear motion that this time allows pick arm 12 to be raised away from input tray 30, in the direction generally indicated by arrow 144, when shuttle assembly 58 is moved in second direction 136.

Figure 14:
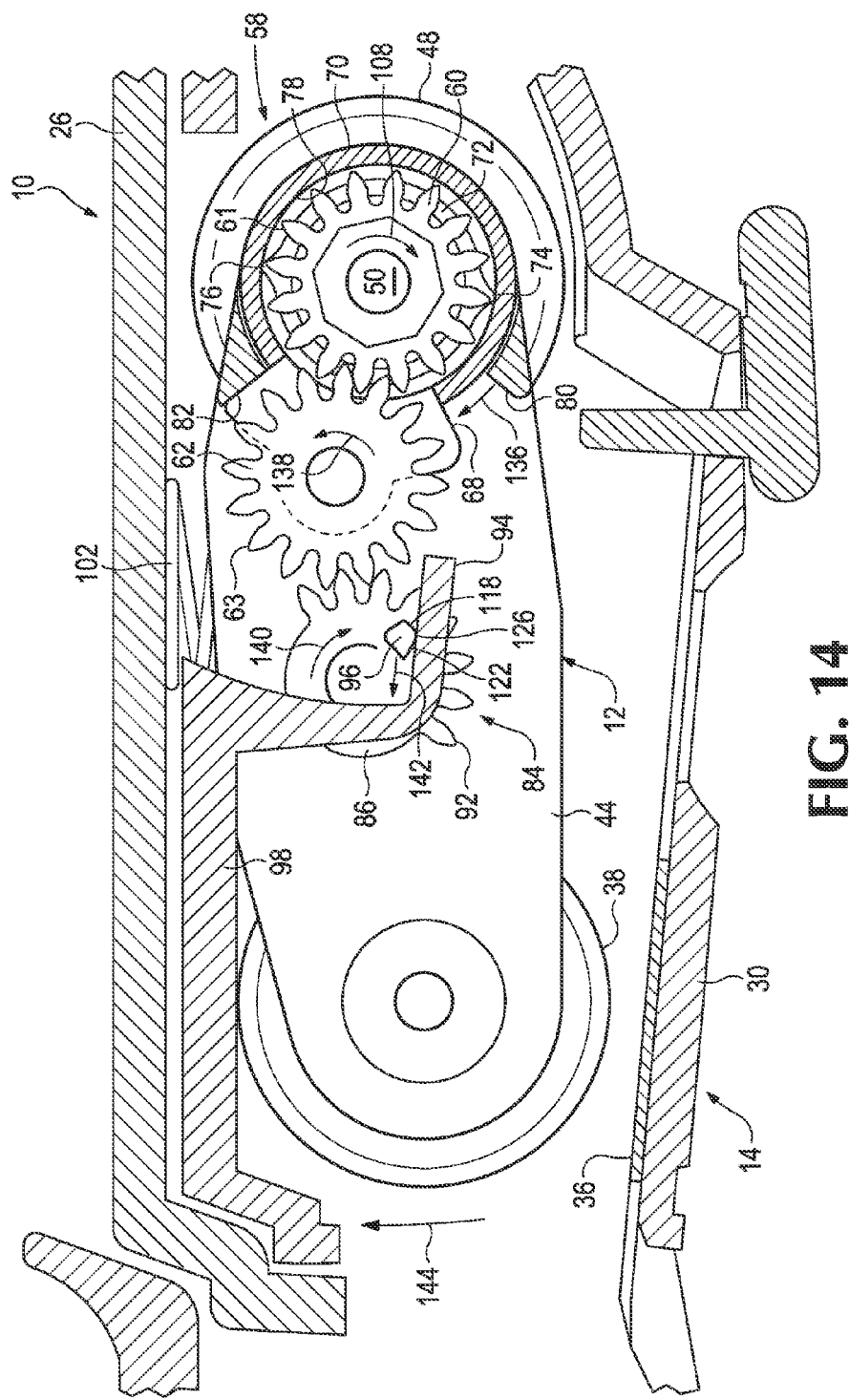
FIG. 14 is an example of a side view of the pick arm of the electronic device of FIG. 1 in a mostly raised position.

An example of a side view of pick arm 12 of automatic document feeder 14 of electronic device 16 of FIG. 1 in a mostly raised position is shown in FIG. 14. As can be seen in FIG. 14, input shaft 50 continues to rotate in a clockwise direction, generally indicated by arrow 108, but further movement of either gear shuttle 68 or shuttle gear 62 continue not to occur because of upper stop 82, which impedes such further movement in the direction of arrow 136. Instead, rotation of input shaft 50 in the direction of arrow 108 continues to cause idler gear 60 to rotate in the clockwise direction, generally indicated by arrow 108 which, in turn, causes shuttle gear 62 to rotate in the counter-clockwise direction, generally indicated by arrow 138, as discussed above.

As also discussed above, rotation of shuttle gear 62 in the counter-clockwise direction of arrow 138, causes lift gear 86 to rotate in second direction, generally indicated by arrow 140, which causes second surface 122 of cam 96 to continue to linearly move along lift hook 94 of lift assembly 84 in the direction of arrow 142 until it again reaches a "tipping" point where second surface 122 of cam 96 ceases to move along lift hook 94 and first surface 118 of cam 96 instead begins to move along lift hook 94. This allows pick arm 12 to raise, in the direction generally indicated by arrow 144, against the urging of biasing member 102 (i.e., instead compressing biasing member 102) and the influence of gravity.

First surface 118, second surface 122, and rounded transition or surface 126 of cam 96 are designed to help pick arm 12 to raise in the direction of arrow 144 in a controlled manner so as to help prevent damage to it, automatic document feeder 14, and electronic device 10. First surface 118, second surface 122, and rounded transition or surface 126 of cam 96 may also be designed to help pick arm 12 raise in the direction of arrow 144 in a controlled manner so as to help lower any associated acoustical noise.

Figure 15:
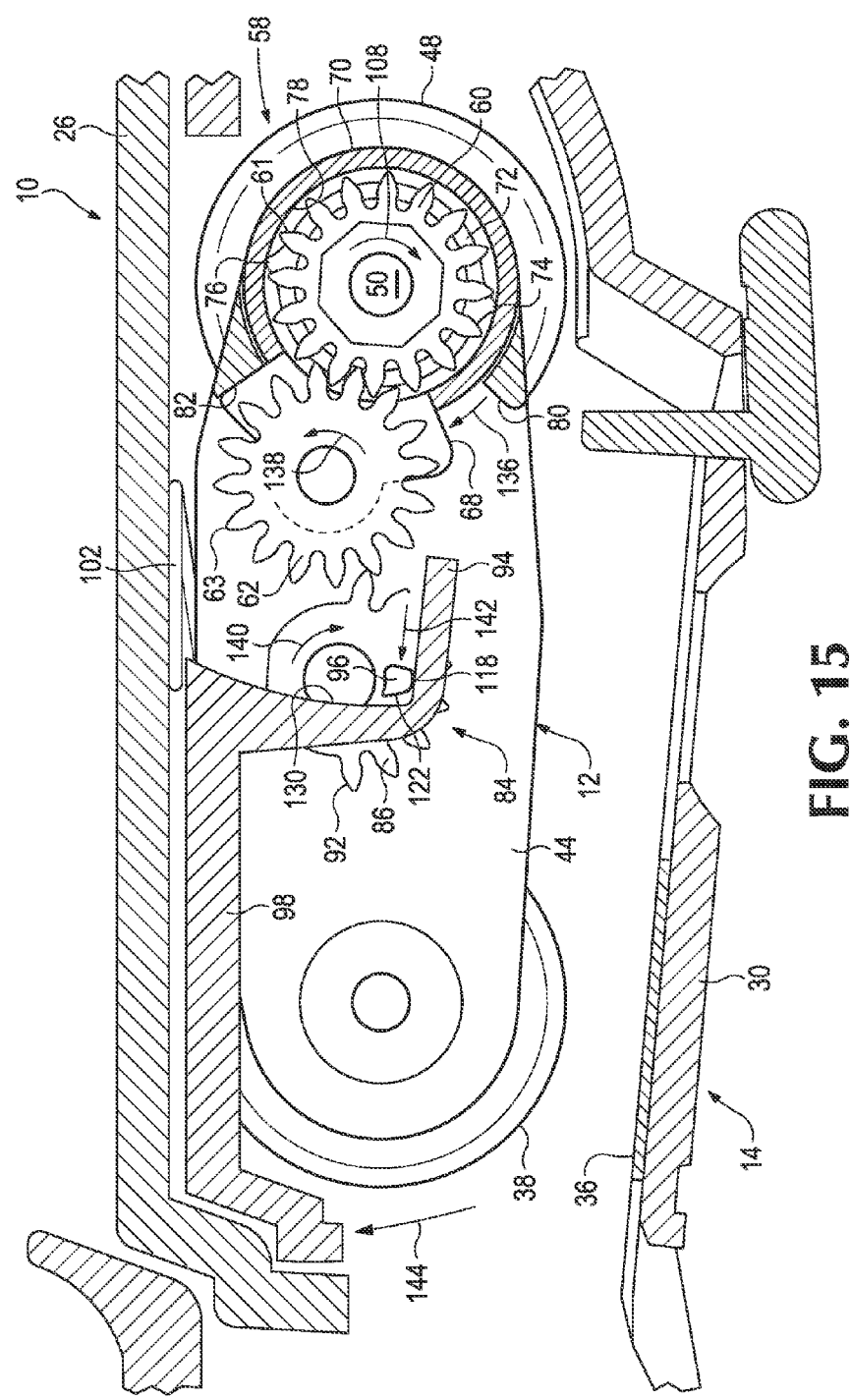
FIG. 15 is an example of a side view of the pick arm of the electronic device of FIG. 1 in a completely raised position.

An example of a side view of pick arm 12 of automatic document feeder 14 of electronic device 16 of FIG. 1 in a completely raised position is shown in FIG. 15. As can be seen in FIG. 15, input shaft 50 continues to rotate in a clockwise direction, generally indicated by arrow 108, but further movement of either gear shuttle 68 or shuttle gear 62 continue not to occur because of upper stop 82, which impedes such further movement in the direction of arrow 136. Instead, rotation of input shaft 50 in the direction of arrow 108 continues to cause idler gear 60 to rotate in the clockwise direction, generally indicated by arrow 108, which, in turn, causes shuttle gear 62 to rotate in the counter-clockwise direction, generally indicated by arrow 138, as discussed above.

Rotation of shuttle gear 62 in the counter-clockwise direction of arrow 138 continues to cause lift gear 86 to rotate in the second direction, generally indicated by arrow 140, which continues to cause first surface 118 of cam 96 to move along lift hook 94 of lift assembly 84.

Figure 16:
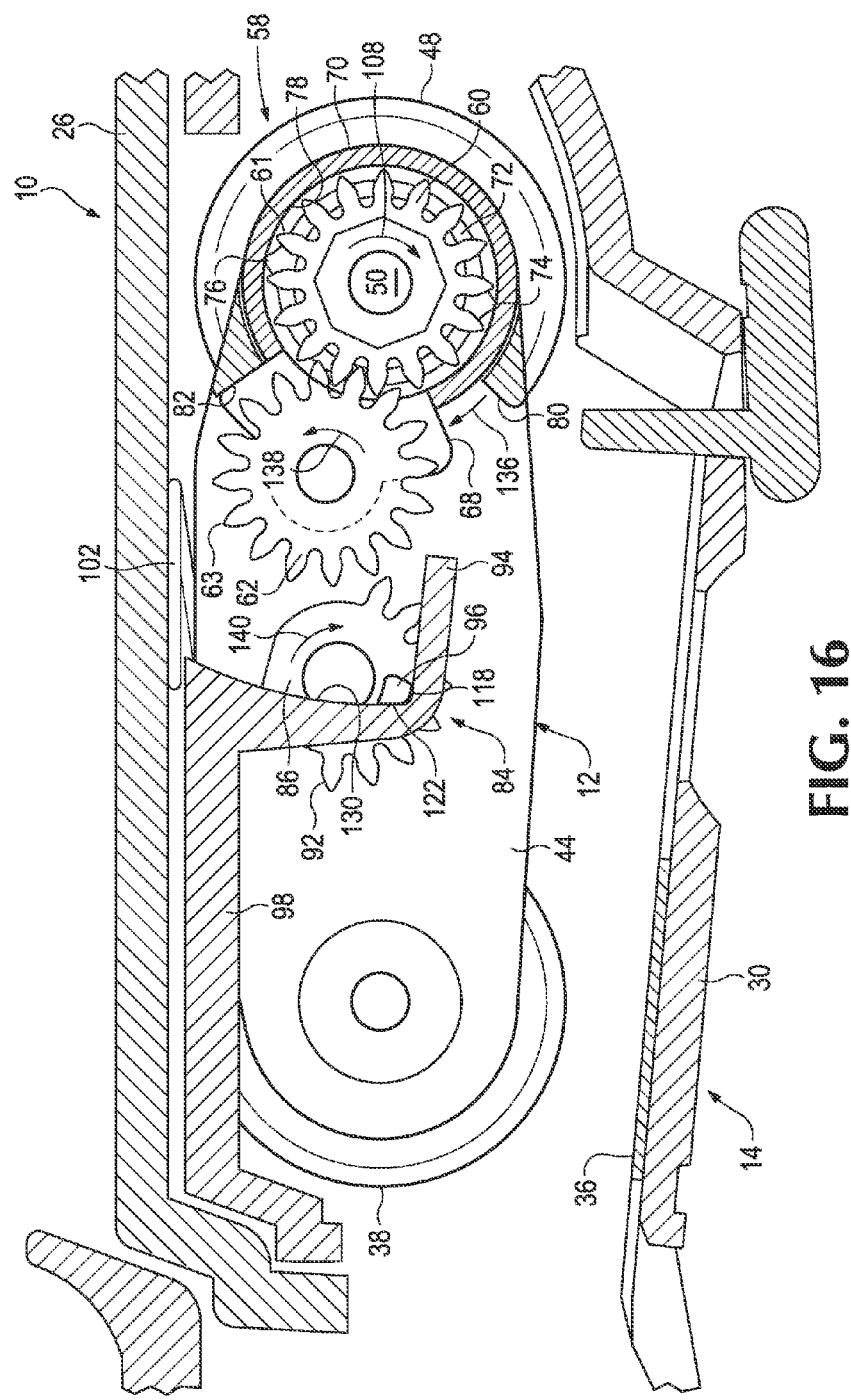
FIG. 16 is an example of a further side view of the pick arm of the electronic device of FIG. 1 in a completely raised and dwell position.

A further example of a side view of pick arm 12 of automatic document feeder 14 of electronic device 16 of FIG. 1 in a completely raised and dwell position (as in FIG. 2, above) is shown in FIG. 16. As can be seen in FIG. 16, input shaft 50 continues to rotate in a clockwise direction, generally indicated by arrow 108, but further movement of either gear shuttle 68 or shuttle gear 62 continue not to occur because of upper stop 82, which impedes such further movement in the direction of arrow 136. Instead, rotation of input shaft 50 in the direction of arrow 108 continues to cause idler gear 60 to rotate in the clockwise direction, generally indicated by arrow 108, which, in turn, causes shuttle gear 62 to rotate in the counter-clockwise direction, generally indicated by arrow 138, as discussed above.

As can be seen in FIG. 16, rotation of shuttle gear 62 in the counter-clockwise direction of arrow 138 ceases to cause lift gear 86 to rotate in second direction 140 because respective teeth 63 and 92 thereof are no longer meshed. Instead, second surface 122 of cam 96 is adjacent surface 130 of lift hook 94, and lift gear 86 has stopped rotating and come to rest. Pick arm 12 may again be lowered by reversing the direction of rotation of input shaft 50 from the clockwise direction 108 to the counter-clockwise direction, generally indicated by arrow 110, as discussed above.

In the example of electronic device 16 discussed above, non-transitory storage medium 22 includes instructions that, when executed by processor 18, cause the processor 18 to actuate mechanism or apparatus 10 to lower pick arm 12 of automatic document feeder 14, as illustrated above in FIGS. 3-8. Non-transitory storage medium 22 also includes additional instructions that, when executed by processor 18, cause the processor 18 to actuate mechanism or apparatus 10 to raise pick arm 12 of automatic document feeder 14, as illustrated above in FIGS. 10-16. Non-transitory storage medium 22 includes further instructions that, when executed by processor 18, cause the processor 18 to actuate pick arm 12 of automatic document feeder 14 to select item or document 34 from a media stack, as illustrated above in FIG. 9.

Figures 17, 18:
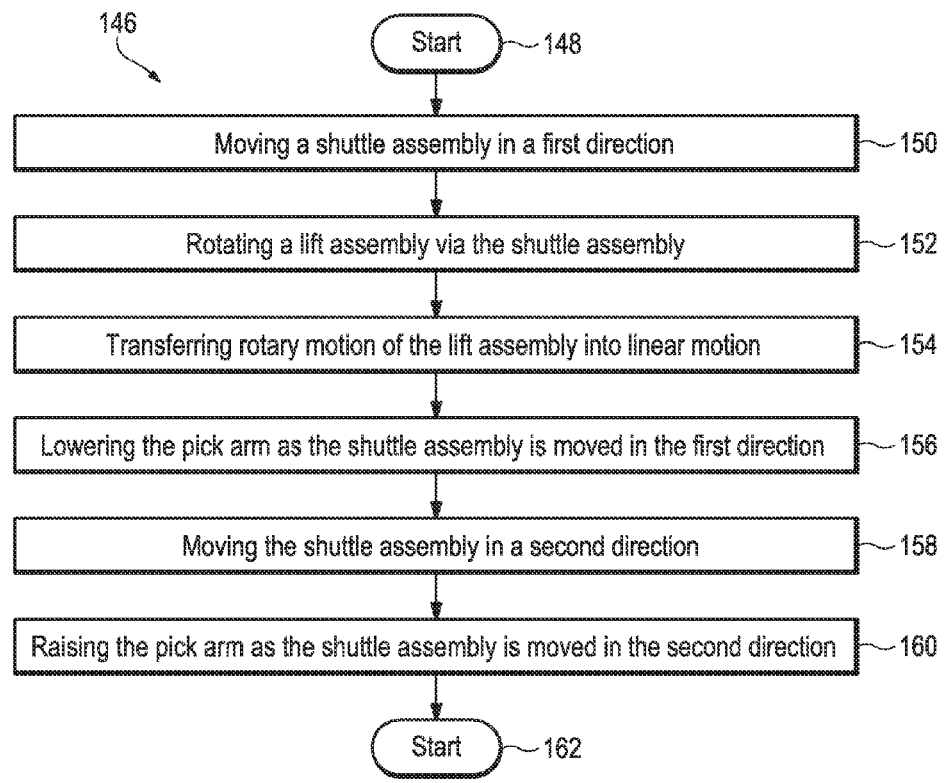
FIG. 17 is an example of a method of lowering and raising a pick arm.
FIG. 18 is an example of an additional element of the method of lowering and raising a pick arm of FIG. 17.

A method 146 for lowering and raising pick arm 12 is shown in FIG. 17. As can be seen in FIG. 17, method 146 starts or begins 148 by moving a shuttle assembly in a first direction, as indicated by block 150, and rotating a lift assembly via the shuttle assembly, as indicated by block 152. Method 146 continues by transferring rotary motion of the lift assembly into linear motion, as indicated by block 154, and lowering the pick arm as the shuttle assembly is moved in the first direction, as indicated by block 156. Method 146 additionally continues by moving the shuttle assembly in a second direction, as indicated by block 158, and raising the pick arm as the shuttle assembly is moved in the second direction, as indicated by block 160. Method 146 may then end 162.

An example of an additional element of method 146 of lowering and raising a pick arm 12 is shown in FIG. 18. As can be seen in FIG. 18, method 146 may additionally include biasing the pick arm to urge the pick arm to lower, as indicated by block 164.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. An apparatus for lowering and raising a pick arm, comprising:
   a shuttle assembly having a first direction of movement and a second direction of movement, wherein the shuttle assembly includes an idler gear and a shuttle gear rotatably meshed with the idler gear:
   a lift assembly rotatably coupled to the shuttle assembly wherein the lift assembly includes a lift gear that meshes with the shuttle gear so as to be driven thereby; and
   a cam coupled to the lift assembly to transform rotary motion of the lift assembly into substantially linear motion that allows the pick arm to lower as a result of movement of the shuttle assembly in the first direction and that raises the pick arm as a result of movement of the shuttle assembly in the second direction, wherein the cam is offset from a center of the lift gear.

2. The apparatus of claim 1, further comprising a biasing member that urges the pick arm to lower and that is compressed when the pick arm is raised.

3. The apparatus of claim 1, wherein the shuttle assembly further includes a gear shuttle movable between a first stop and a second stop.

4. The apparatus of claim 1, wherein the lift assembly includes a lift hook on which the cam travels.

5. The apparatus of claim 1, further comprising one of a multi-function printer and an automatic document feeder.

6. The apparatus of claim 1, further comprising a non-transitory storage medium including instructions that, when executed by a processor, cause the processor to actuate a mechanism for raising and lowering a pick arm to:
   move a shuttle assembly in a first direction;
   rotate a lift assembly via the shuttle assembly;
   lower the pick arm as a result of movement of the shuttle assembly in the first direction;
   move the shuttle assembly in a second direction; and
   raise the pick arm as a result of movement of the shuttle assembly in the second direction.

7. An apparatus for lowering and raising a pick arm, comprising:
   a shuttle gear having a clockwise direction of rotation and a counter-clockwise direction of rotation, and movable in a first direction and a second direction;
   a lift gear rotatably driven by the shuttle gear during both a first period of time and a second period of time, wherein the lift gear meshes with the shuttle gear so as to be driven thereby;
   a cam coupled to the lift gear that transforms rotary motion of the lift gear into substantially linear motion that allows the pick arm to lower as a result of movement of the shuttle gear in the first direction and that raises the pick arm as a result of movement of the shuttle gear in the second direction, wherein the cam is offset from a center of the lift gear.

8. The apparatus of claim 7, wherein the lift gear is rotated in a first direction during the first period and a second direction during the second period.

9. The apparatus of claim 8, wherein the first direction of rotation of the lift gear during the first period is counter-clockwise with respect to the clockwise direction of rotation of the shuttle gear, and further wherein the second direction of rotation of the lift gear during the second period is clockwise with respect to the counter-clockwise direction of rotation of the shuttle gear.

10. The apparatus of claim 7, further comprising a biasing member that urges the pick arm to lower and that is compressed when the pick arm is raised.

11. The apparatus of claim 7, further comprising one of a multi-function printer and an automatic document feeder that includes an upper case part on which the cam travels.

12. The apparatus of claim 7, wherein the cam has a generally trapezoidal cross-section.

13. A method for lowering and raising a pick arm, comprising:
   moving a shuttle assembly in a first direction, wherein the shuttle assembly includes an idler ear and a shuttle gear rotatably meshed with the idler ear;
   rotating a lift assembly via the shuttle assembly, wherein the lift assembly includes a lift gear that meshes with the shuttle gear so as to be driven thereby;
   using a cam to transfer rotary motion of the lift assembly into linear motion, wherein the cam is offset from a center of the lift gear;
   lowering the pick arm as the shuttle assembly is moved in the first direction;
   moving the shuttle assembly in a second direction; and
   raising the pick arm as the shuttle assembly is moved in the second direction.

14. The method of claim 13, further comprising biasing the pick arm to urge the pick arm to lower.

\* \* \* \* \*

UNITED STATES PATENT AND TRADEMARK OFFICE
CERTIFICATE OF CORRECTION

| | |
|---|---|
| PATENT NO. | : 9,056,734 B2 |
| APPLICATION NO. | : 13/586130 |
| DATED | : June 16, 2015 |
| INVENTOR(S) | : Glenn W. Gaarder et al. |

It is certified that error appears in the above-identified patent and that said Letters Patent is hereby corrected as shown below:

IN THE CLAIMS

In column 11, line 12, in Claim 1, delete "assembly" and insert -- assembly, --, therefor.

In column 12, line 32, in Claim 13, delete "ear" and insert -- gear --, therefor.

In column 12, line 33, in Claim 13, delete "ear" and insert -- gear --, therefor.

Signed and Sealed this
Twenty-sixth Day of January, 2016

Michelle K. Lee
*Director of the United States Patent and Trademark Office*